United States Patent
Soejima et al.

(10) Patent No.: US 10,202,924 B2
(45) Date of Patent: Feb. 12, 2019

(54) CONTROL APPARATUS FOR SUPERCHARGED ENGINE

(75) Inventors: Shinichi Soejima, Gotenba (JP); Akira Eiraku, Sunto-gun (JP); Satoru Tanaka, Odawara (JP); Satoshi Yoshizaki, Gotenba (JP); Kiyonori Takahashi, Susono (JP); Yoshihiro Sakayanagi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 176 days.

(21) Appl. No.: 14/416,355

(22) PCT Filed: Jul. 25, 2012

(86) PCT No.: PCT/JP2012/068876
§ 371 (c)(1),
(2), (4) Date: Jan. 22, 2015

(87) PCT Pub. No.: WO2014/016926
PCT Pub. Date: Jan. 30, 2014

(65) Prior Publication Data
US 2015/0184606 A1 Jul. 2, 2015

(51) Int. Cl.
*F02D 41/18* (2006.01)
*F02D 23/00* (2006.01)
(Continued)

(52) U.S. Cl.
CPC ............ *F02D 41/18* (2013.01); *F02B 25/145* (2013.01); *F02D 11/105* (2013.01);
(Continued)

(58) Field of Classification Search
CPC ............ F02D 13/0215; F02D 13/0234; F02D 13/0261; F02D 2200/0402;
(Continued)

(56) References Cited

U.S. PATENT DOCUMENTS 5,339,681 A * 8/1994 Sekozawa ............. F02D 41/045
73/114.32
6,390,063 B1 * 5/2002 Obata ....................... F01L 9/04
123/399
(Continued)

FOREIGN PATENT DOCUMENTS

DE 102007023849 A1 * 11/2008 ........... G05B 13/041
EP 2187026 A1 5/2010
(Continued)

*Primary Examiner* — John Zaleskas
(74) *Attorney, Agent, or Firm* — Hunton Andrews Kurth LLP

(57) ABSTRACT

It is an object of the invention to enhance the possibility of realizing a required torque in a supercharging region where scavenging occurs in a control apparatus for a supercharged engine. In order to achieve this object, the control apparatus for the supercharged engine according to the invention determines an operation amount of an intake valve driving device from a target in-cylinder air amount that is calculated from a required torque, and determines an operation amount of a throttle from a target intake valve passing air amount that is obtained by adding an amount of air blowing through an interior of a cylinder to the target in-cylinder air amount.

5 Claims, 6 Drawing Sheets

(51) Int. Cl.
  *F02D 41/14* (2006.01)
  *F02B 25/14* (2006.01)
  *F02D 13/02* (2006.01)
  *F02D 11/10* (2006.01)
  *F02D 41/00* (2006.01)

(52) U.S. Cl.
  CPC ......... *F02D 13/0215* (2013.01); *F02D 23/00* (2013.01); *F02D 41/0007* (2013.01); *F02D 41/14* (2013.01); *F02D 2041/001* (2013.01); *F02D 2200/0406* (2013.01); *Y02T 10/144* (2013.01); *Y02T 10/18* (2013.01)

(58) Field of Classification Search
  CPC ..... F02D 2200/0406; F02D 2200/0408; F02D 2200/0411; F02D 41/0007; F02D 41/18; F02D 2041/001; F02D 23/00; F02D 11/105; F02B 25/145
  USPC ......... 123/90.15, 346, 348, 399, 403, 559.1, 123/564; 60/598, 602, 605.1; 701/101, 701/102, 103
  See application file for complete search history.

(56) References Cited

U.S. PATENT DOCUMENTS

| | | | |
|---|---|---|---|
| 2006/0037596 A1 | 2/2006 | Fuwa | |
| 2007/0240679 A1* | 10/2007 | Tabata | F02B 29/083 123/348 |
| 2007/0251233 A1* | 11/2007 | Bardoll | F02B 37/24 60/602 |
| 2007/0256666 A1* | 11/2007 | Cunningham | F02B 25/145 123/445 |
| 2008/0033627 A1* | 2/2008 | Tanaka | F02B 39/16 701/102 |
| 2008/0033628 A1* | 2/2008 | Guzzella | F01N 3/101 701/103 |
| 2008/0077304 A1 | 3/2008 | Suzuki et al. | |
| 2009/0007564 A1* | 1/2009 | Suzuki | F02B 37/18 60/602 |
| 2009/0050118 A1* | 2/2009 | Delp | F02D 13/0261 123/559.2 |
| 2009/0070009 A1* | 3/2009 | Delp | F02D 41/1497 701/103 |
| 2010/0088005 A1* | 4/2010 | Sakayanagi | B60W 40/12 701/102 |
| 2010/0131174 A1* | 5/2010 | Wiggins | F02D 13/02 701/103 |
| 2010/0154757 A1* | 6/2010 | Miyamoto | F02D 11/105 123/559.1 |
| 2010/0211294 A1 | 8/2010 | Soejima | |
| 2010/0217504 A1* | 8/2010 | Fujii | F01L 1/344 701/105 |
| 2010/0263639 A1* | 10/2010 | Uhrich | F02D 41/0007 123/564 |
| 2010/0312451 A1* | 12/2010 | Karnik | F01N 3/10 701/102 |
| 2011/0040476 A1* | 2/2011 | Ogawa | F02B 25/145 701/108 |
| 2011/0054760 A1* | 3/2011 | Ogawa | F02B 25/145 701/102 |
| 2011/0144892 A1* | 6/2011 | Katsumata | F02D 23/00 701/104 |
| 2011/0209685 A1* | 9/2011 | Shane | F02D 41/0002 123/299 |
| 2012/0143476 A1* | 6/2012 | Hagner | F02D 41/0007 701/103 |
| 2012/0316756 A1* | 12/2012 | Tsuyuki | F02D 35/023 701/104 |
| 2013/0111900 A1* | 5/2013 | Hagner | F02D 41/0062 60/602 |
| 2013/0152584 A1* | 6/2013 | Jankovic | F02D 41/1456 60/611 |
| 2014/0000554 A1* | 1/2014 | Tsuyuki | F02D 41/0007 123/295 |

FOREIGN PATENT DOCUMENTS

| | | | |
|---|---|---|---|
| JP | 63297746 A | * | 12/1988 |
| JP | 2004-263571 A | | 9/2004 |
| JP | 2007263083 A | * | 10/2007 |
| JP | 2008-075549 A | | 4/2008 |
| JP | 2008175201 A | * | 7/2008 |
| JP | 2009-068403 A | | 4/2009 |

* cited by examiner

CONTROL APPARATUS FOR SUPERCHARGED ENGINE

CROSS-REFERENCE TO RELATED APPLICATION

This is a national phase application based on the PCT International Patent Application No. PCT/JP2012/068876 filed Jul. 25, 2012, the entire contents of which are incorporated herein by reference.

TECHNICAL FIELD

The invention relates to a torque demand control-type control apparatus that is employed for a supercharged engine.

BACKGROUND ART

As a control method for an internal combustion engine, torque demand control for determining operation amounts of actuators using a torque as a controlled variable is known. The actuators operated through torque demand control include those regarding the amount of air, those regarding the ignition timing, and those regarding the air-fuel ratio. Among these actuators, those regarding the amount of air include, for example, a throttle, a variable valve timing mechanism that changes the valve timing of an intake valve, and a variable valve timing mechanism that changes the valve timing of an exhaust valve.

FIG. 7 is a functional block diagram showing the configuration of a control apparatus for an NA engine that performs conventionally proposed torque demand control. A control apparatus 200 shown in FIG. 7 is designed to operate a throttle 10, an intake valve variable valve timing mechanism (hereinafter referred to as an IN-VVT) 20, and an exhaust valve variable valve timing mechanism (hereinafter referred to as an EX-VVT) 30. Then, the control apparatus 200 is equipped with a target air amount calculation unit 210, a VVT control unit 220, and a throttle control unit 230.

The target air amount calculation unit 210 calculates an amount of air needed to realize a required torque, as a target air amount. The calculation is carried out with the aid of a map in which a torque and an air amount are associated with each other using various pieces of engine information such as an engine rotational speed, an ignition timing, an air-fuel ratio and the like as arguments.

The VVT control unit 220 selects a combination that optimizes fuel economy, among combinations of a valve timing of an intake valve that can be realized through operation of the IN-VVT 20 and a valve timing of an exhaust valve that can be realized through operation of the EX-VVT 30. Such a combination is stored in advance as a base valve timing. The VVT control unit 220 determines a command value for the IN-VVT 20 (an IN-VVT command value) and a command value for the EX-VVT 30 (an EX-VVT command value) respectively, in accordance with the base valve timing.

Besides, the VVT control unit 220 stores, in the form of a map, a relationship that is established among a valve overlap amount, an intake pressure, and an air amount. In FIG. 7, an image of the map is represented in the form of a graph in a block indicating the VVT control unit 220. The air amount that is associated with the valve overlap amount and the intake pressure in this map is, in a precise sense, an amount of air that has entered a cylinder through the intake valve. On the other hand, the target air amount that is calculated from the required torque is, in a precise sense, an amount of air used for combustion, namely, a target value of an in-cylinder air amount. However, as will be described later, an intake valve passing air amount coincides with the in-cylinder air amount at least in an NA engine, so there is no problem in applying the target air amount to the aforementioned map. The VVT control unit 220 selects an intake pressure corresponding to the valve overlap amount at the base valve timing, among combinations of the intake pressure and the valve overlap amount that can realize the target air amount, and determines the selected intake pressure as a target intake pressure.

The throttle control unit 230 calculates a throttle opening degree from the target intake pressure and the target air amount. The inverse model of an air model is used to calculate the throttle opening degree. The air model is a physical model that is obtained by modeling dynamic properties of the pressure and flow rate in an intake passage in response to the motion of the throttle. The throttle control unit 230 operates the throttle 10 using the calculated throttle opening degree as an operation, amount.

The control apparatus thus configured makes it possible to control the in-cylinder air amount in the engine to an air amount that is neither too large nor too small to realize the required torque, through cooperative operation of the throttle 10, the IN-VVT 20, and the EX-VVT 30.

By the way, it is conceivable to apply the aforementioned torque demand control to the control of a supercharged engine that is equipped with a turbosupercharger or a mechanical supercharger. If the configuration for torque demand control of the NA engine shown in FIG. 7 is directly utilized, a configuration shown in, for example, FIG. 8 can be adopted as a configuration of the control apparatus that is needed to perform torque demand control of the supercharged engine. A control apparatus 201 shown in FIG. 8 is designed to operate a waste gate valve (hereinafter referred to as a WGV) 40 in addition to the throttle 10, the IN-VVT 20, and the EX-VVT 30. Then, the control apparatus 201 is equipped with a target supercharging pressure calculation unit 240 and a WGV control unit 250 in addition to the target air amount calculation unit 210, the VVT control unit 220, and the throttle control unit 230.

In the case of a supercharged engine, the intake pressure may reach an upper limit due to the opening of the throttle 10 to a fully open state in a supercharging region where supercharging is carried out by a supercharger. In that case, the VVT control unit 220 specifies combinations of the intake pressure and the valve overlap amount that can realize the target air amount with the aid of the foregoing map, and selects the valve overlap amount corresponding to the upper limit of the intake pressure out of those combinations. It should be noted, however, that there are many combinations of the valve timings of the intake valve and the exhaust valve that can realize the selected valve overlap amount, so the command values for the respective variable valve timing mechanisms 20 and 30 are not uniquely determined. For instance, it is conceivable to select the combination closest to the base valve timing, and determine the command values for the respective variable valve timing mechanisms 20 and 30 in accordance with the selected combination. Incidentally, in the case where the intake pressure has not reached the upper limit, the base valve timing is selected as a combination of the respective valve timings of the intake valve and the exhaust valve, and the intake pressure corresponding to the valve overlap amount at the base valve timing is determined as the target intake pressure, as is the case with the NA engine.

The target supercharging pressure calculation unit 240 calculates a value obtained by adding a predetermined reserve pressure to the target intake pressure, as a target supercharging pressure. The WGV control unit 250 determines a duty value imparted to a solenoid that drives the WGV 40, based on the target supercharging pressure. As an example of the method of determining the duty value, it is possible to mention a method in which a map that associates the duty value with the supercharging pressure is prepared and a duty value corresponding to the target supercharging pressure is calculated from the map. Besides, it is also possible to mention a method in which an actual supercharging pressure is measured or estimated, and the duty value is subjected to feedback control such that the actual supercharging pressure becomes equal to the target supercharging pressure.

The control apparatus thus configured makes it possible to cause the engine to output a required torque through the same control as in the case of the NA engine, in an NA region where supercharging is not carried out by the turbosupercharger.

However, in the supercharging region where supercharging is carried out by the turbosupercharger, the following problem arises as to the accuracy in realizing the required torque.

FIG. 9 shows an image of a control result in the supercharging region by the control apparatus configured as shown in FIG. 8. According to the control apparatus shown in FIG. 8, the target air amount is calculated from the required torque, and the throttle 10, the IN-VVT 20, the EX-VVT 30, and the WGV 40 are cooperatively operated in such a manner as to realize the target air amount. However, the air amount that is actually realized by the control apparatus shown in FIG. 8 is smaller than the target air amount.

This shortfall in the air amount results from direct application of the control method for the NA engine to the supercharged engine. In the NA engine, the exhaust pressure is higher than the intake pressure. Therefore, in the case where the open period of the intake valve and the open period of the exhaust valve overlap with each other, combustion gas remains in the cylinder in accordance with the overlap amount. In other words, so-called internal EGR is caused. In this case, the air (fresh air) that has entered the cylinder through the intake valve remains in the cylinder, and the sum of the intake valve passing air amount and the amount of residual combustion gas resulting from internal EGR is a total amount of gas in the cylinder. Consequently, in the case of the NA engine, the intake valve passing air amount and the amount of air in the cylinder that is actually used for combustion coincide with each other, regardless of whether or not those open periods overlap with each other.

On the other hand, in the case of the supercharged engine, the intake pressure is higher than the exhaust pressure in the supercharging region. Therefore, in the case where the open period of the intake valve and the open period of the exhaust valve overlap with each other, scavenging, namely, the blow of air from an intake pipe through an exhaust pipe occurs in the supercharging region. In the case where scavenging occurs, part of the air that has entered the cylinder through the intake valve flows through the exhaust pipe. Therefore, the in-cylinder air amount that is actually used for combustion is smaller than the intake valve passing air amount by an amount corresponding to scavenging. As a result, as shown in FIG. 9, the in-cylinder air amount that is actually realized is smaller than the target air amount, so the realized torque falls short of the required torque.

As is apparent from the foregoing, in the case where torque demand control is applied to the supercharged engine, it is inappropriate to directly utilize the configuration for torque demand control in the NA engine. Torque demand control for the supercharged engine requires a control apparatus that makes it possible to accurately realize the required torque even in the supercharging region where scavenging occurs.

Incidentally, the documents mentioned below are related-art documents indicating the state of the art in a technical field according to the present application.

RELATED ART DOCUMENTS

Patent Documents

Patent Document 1: Japanese Patent Application Publication No. 2009-068403 (JP-2009-068403 A)
Patent Document 2: Japanese Patent Application Publication No. 2008-075549 (JP-2008-075549 A)
Patent Document 3: Japanese Patent Application Publication No. 2004-263571 (JP-2004-263571 A)

SUMMARY OF THE INVENTION

Problem to be Solved by the Invention

The invention has been made in view of the aforementioned problem. It is an object of the invention to provide a control apparatus for a supercharged engine capable of enhancing the possibility of realizing a required torque in a supercharging region where scavenging occurs.

A control apparatus for a supercharged engine according to the invention is applied to a supercharged engine having a throttle, an intake valve driving device, and a supercharger. The intake valve driving device may be a device capable of changing at least a timing for closing an intake valve. The control apparatus for the supercharged engine according to the invention determines an operation amount of the intake valve driving device from a target in-cylinder air amount that is calculated from a required torque. Then, in parallel, the control apparatus determines an operation amount of a throttle from a target intake valve passing air amount that is obtained by adding an amount of air blowing through an interior of a cylinder to the target in-cylinder air amount. The amount of air blowing through the interior of the cylinder means an amount of air flowing through the exhaust pipe as part of the air that has entered the cylinder through the intake valve. The amount of air that is added to the target in-cylinder air amount may be a target value that is determined by some demand for engine performance, a fixed value, or a predetermined value such as a fluctuant value corresponding to an operating state or the like.

The control apparatus for the supercharged engine according to the invention realizes a required torque through operation of the intake valve driving device in a case where supercharging is carried out by the supercharger and an intake pressure reaches an upper limit of a range that can be adjusted through operation of the throttle. In that case, the operation amount of the intake valve driving device is determined from the target in-cylinder air amount that is calculated from the required torque, based on a relationship that is established among the timing for closing the intake valve, the intake pressure, and an in-cylinder air amount.

A timing for opening the intake valve and the timing for closing the intake valve are determined by fixing the operation amount of the intake valve driving device. It should be noted, however, that what is important is the timing for closing the intake valve as a factor determining the in-cylinder air amount. This is because the in-cylinder air amount is uniquely determined by the timing for closing the intake valve in the case where the intake pressure reaches an upper limit. On the other hand, the timing for opening the intake valve influences an overlap amount of an open period of the intake valve and an open period of an exhaust valve. However, a valve overlap amount in a supercharging region where scavenging occurs does not influence the in-cylinder air amount, and hence, does not influence the accuracy in realizing the required torque either. In consequence, the open period of the intake valve is not limited in particular.

The supercharged engine can be equipped with an exhaust valve driving device. The exhaust valve driving device may be a device capable of changing at least the timing for closing the exhaust valve. If the timing for closing the exhaust valve is fixed, the valve overlap amount is fixed. The valve overlap amount does not influence the accuracy in realizing the required torque, but the scavenging amount, namely, the amount of air blowing through the interior of the cylinder increases or decreases in accordance with the magnitude of the valve overlap amount. A total value of the scavenging amount and the in-cylinder air amount is an intake valve passing air amount. Therefore, in the case where the intake pressure has reached the upper limit, the intake valve passing air amount is uniquely determined by the valve overlap amount. There are various demands on the scavenging amount in terms of the warmup of a catalyst, prevention of pre-ignition and the like. Therefore, a target intake valve passing air amount may be determined in light of such demands, and an operation amount of the exhaust valve driving device may be determined in such a manner as to realize the target intake valve passing air amount. In that case, the operation amount of the exhaust valve driving device can be determined from the target intake valve passing air amount and the operation amount of the intake valve driving device (more specifically, the timing for opening the intake valve), based on a relationship that is established among the valve overlap amount, the intake pressure, and the intake valve passing air amount.

Besides, the supercharger with which the supercharged engine is equipped in the invention may be a mechanical supercharger or a turbosupercharger. However, if the turbosupercharger capable of changing the supercharging properties by an actuator attached thereto is employed, the supercharging pressure can be actively controlled through operation of the actuator. For example, a target value of the in-cylinder air amount per unit time may be calculated from the target in-cylinder air amount and an engine rotational speed, and an operation amount of the actuator may be determined from the target value of the in-cylinder air amount per unit time and a target supercharging pressure, based on a relationship that is established between the operation amount of the actuator and the supercharging properties of the turbosupercharger. In this case, if a current value falls short of the target value of the in-cylinder air amount per unit time, an apparent air amount can be increased with the aid of scavenging. Concretely, a target scavenging amount may be calculated from a shortfall in the current value with respect to the target value of the in-cylinder air amount per unit time, and an operation amount of the exhaust valve driving device may be determined using a total value of the target in-cylinder air amount and the target scavenging amount as a target intake valve passing air amount.

MODE FOR CARRYING OUT THE INVENTION

The embodiment of the invention will be described hereinafter with reference to the drawings.

A supercharged engine to which a control apparatus according to the present embodiment of the invention is applied is a spark ignition-type four-cycle reciprocating engine that is equipped with a turbosupercharger having a waste gate valve (a WGV). An intake passage of this supercharged engine is mounted with an electronically controlled throttle. Besides, an intake valve is mounted with an intake valve variable valve timing mechanism (an IN-VVT), and an exhaust valve is mounted with an exhaust valve variable valve timing mechanism (an EX-VVT).

The operation of the supercharged engine is controlled by a vehicular electronic control unit (a vehicular ECU). The ECU is endowed with various functions such as vehicle control, engine control, transmission control and the like. The control apparatus according to the present embodiment of the invention is realized as some of the functions with which the ECU is endowed. Various pieces of information on the operating state and operating condition of the supercharged engine are input to the ECU from various sensors including an airflow meter and a crank angle sensor. In the case where the ECU functions as the control apparatus according to the present embodiment of the invention, the ECU cooperatively operates actuators regarding the amount of air, namely, the throttle, the IN-VVT, the EX-VVT and the WGV according to a control program for torque demand control that is stored in a memory.

Figure 1:
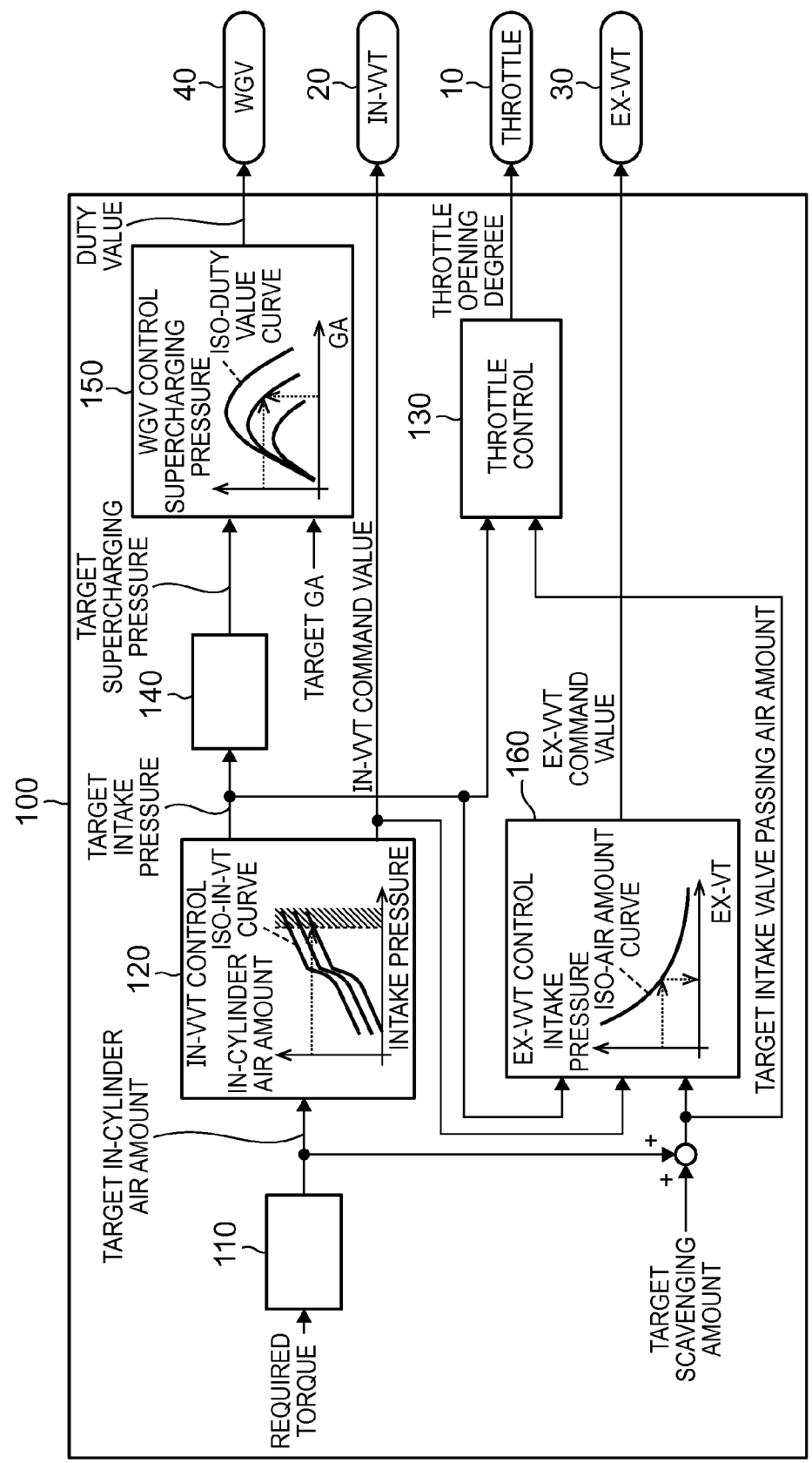
FIG. 1 is a functional block diagram showing the configuration of a control apparatus for a supercharged engine according to an embodiment of the invention.

FIG. 1 is a functional block diagram showing the configuration of a control apparatus that is realized when the ECU functions according to the control program. A control apparatus 100 according to the present embodiment of the invention is constituted of a target air amount calculation unit 110, an IN-VVT control unit 120, a throttle control unit 130, an EX-VVT control unit 160, a target supercharging pressure calculation unit 140, and a WGV control unit 150.

Figure 7:
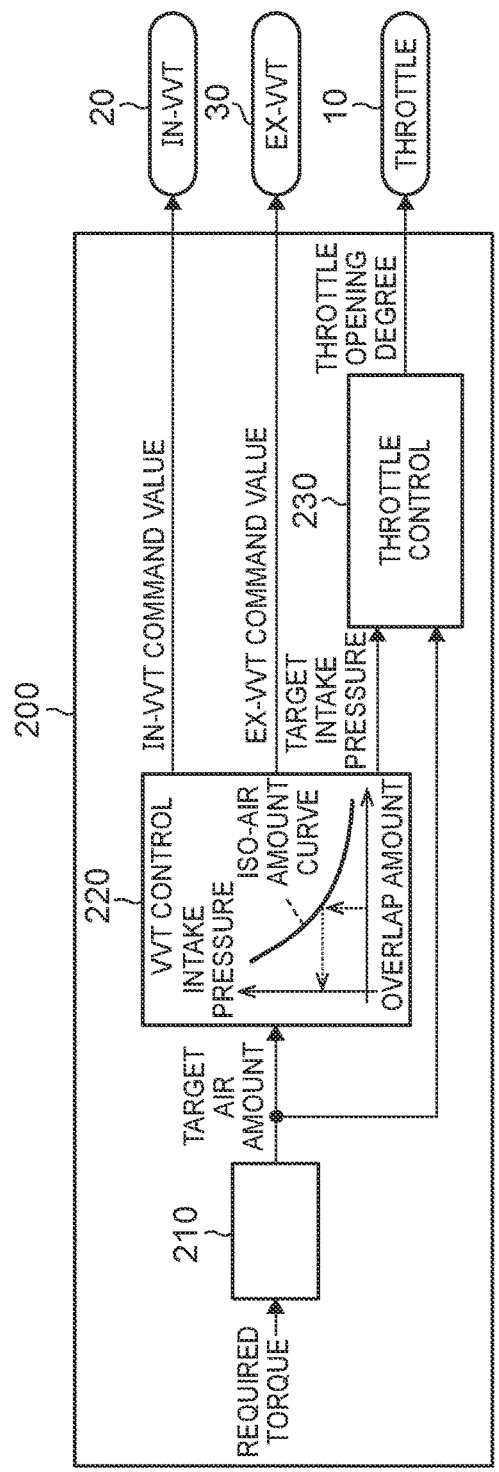
FIG. 7 is a functional block diagram showing the configuration of a control apparatus for a conventional NA engine.
Figure 8:
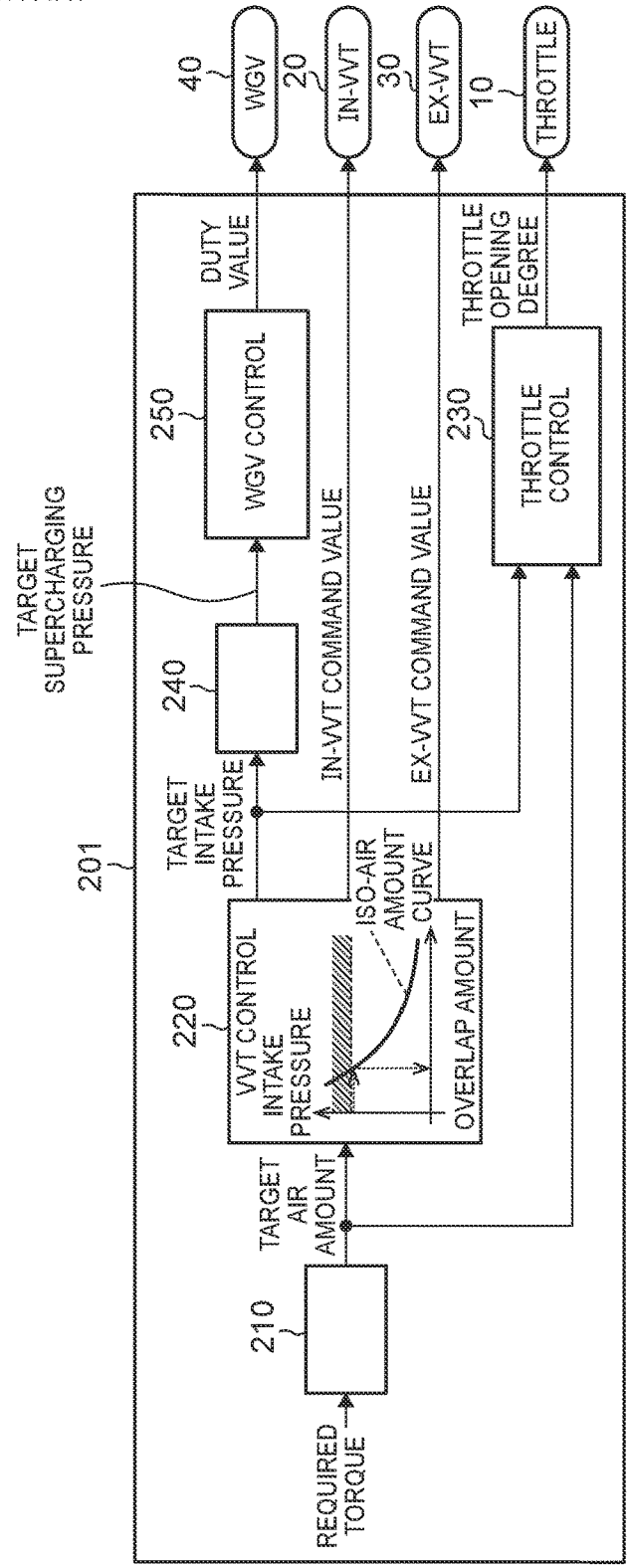
FIG. 8 is a functional block diagram showing the configuration of a control apparatus for a supercharged engine that utilizes the configuration of the control apparatus for the conventional NA engine.
Figure 9:
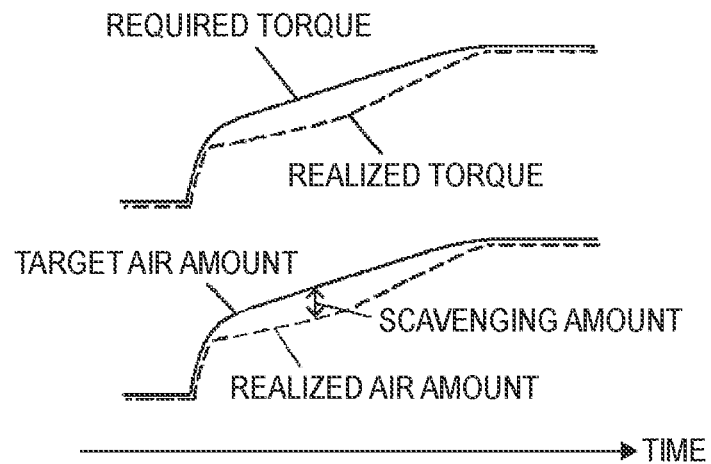
FIG. 9 is a view showing an image of a control result obtained by the control apparatus configured as shown in FIG. 8.

It should be noted, however, that the configuration shown in FIG. 1 is a configuration that is employed in a supercharging region where supercharging is carried out by a turbosupercharger. In an NA region where supercharging is not carried out by the turbosupercharger (i.e., the supercharging pressure has not risen), the configuration for torque demand control of the conventional NA engine shown in FIG. 7 can be employed. The configuration of the control apparatus 100 that is adopted in the supercharging region will be described hereinafter.

The target air amount calculation unit 110 calculates an in-cylinder air amount that is needed to realize a required torque, as a target in-cylinder air amount. The calculation is carried out with the aid of a map that associates the torque and the in-cylinder air amount with each other using various pieces of engine information such as an engine rotational speed, an ignition timing, an air-fuel ratio and the like as arguments. The map used herein is the same as a map that is used in torque demand control of an NA engine to calculate a target air amount from a required torque.

The IN-VVT control unit 120 determines a valve timing command value (an IN-VVT command value) as an operation amount of the IN-VVT 20 and a target intake pressure from a target in-cylinder air amount. The determination is made with the aid of a map that associates the in-cylinder air amount with the valve timing of the intake valve and the intake pressure. In FIG. 1, an image of the map is represented in the form of a graph in a block indicating the IN-VVT control unit 120.

Figure 2:
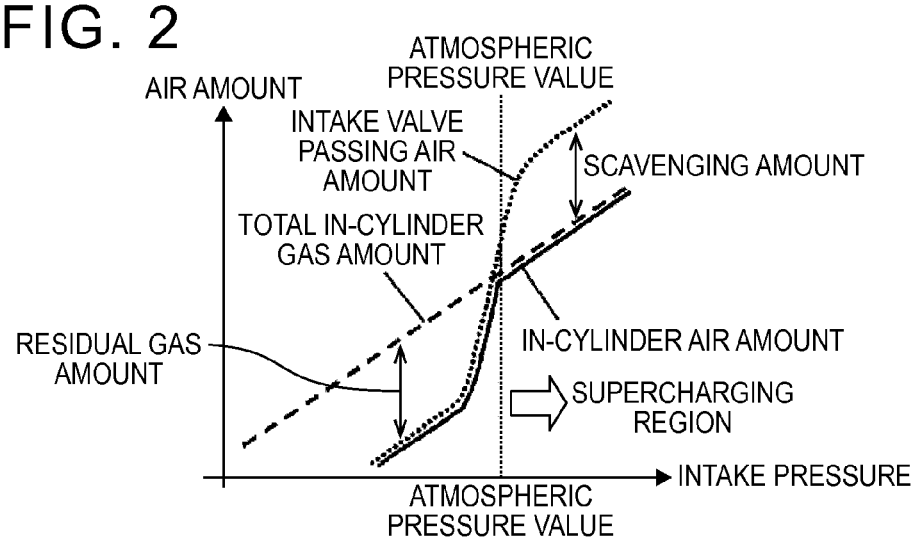
FIG. 2 is a graph showing a relationship between an intake pressure and respective air amounts.

FIG. 2 is a view for explaining a relationship between the intake pressure and the in-cylinder air amount as defined by the map of the IN-VVT 20. A graph shown in FIG. 2 linearly represents how the in-cylinder air amount, an intake valve passing air amount, and an in-cylinder total gas amount are related to the intake pressure in the case where the respective valve timings of the intake valve and the exhaust valve and the engine rotational speed are made constant. The in-cylinder total gas amount increases in proportion to the rise in the intake pressure. In contrast, the intake valve passing air amount increases as the intake pressure rises, but increases non-uniformly. In the NA region where the intake pressure is lower than the atmospheric pressure, the intake valve passing air amount is smaller than the in-cylinder total gas amount by a residual gas amount resulting from internal EGR. However, the residual gas amount decreases as the intake pressure approaches the atmospheric pressure, and the intake valve passing air amount coincides with the in-cylinder total gas amount as soon as the intake pressure coincides with the atmospheric pressure. Then, in the supercharging region where the intake pressure is higher than the atmospheric pressure, the intake valve passing air amount is larger than the in-cylinder total gas amount by a scavenging amount, namely, an amount of air that blows through the interior of the cylinder to flow from an intake pipe to an exhaust pipe. The relationship between the intake pressure and the in-cylinder total gas amount depends only on the valve timing of the intake valve, more specifically, only on the timing for closing the intake valve. On the other hand, the relationship between the intake pressure and the intake valve passing air amount depends on the valve timings of both the intake valve and the exhaust valve.

The in-cylinder air amount contributing to the torque is the smaller of the intake valve passing air amount and the in-cylinder total gas amount. In consequence, the in-cylinder air amount coincides with the intake valve passing air amount in the NA region where the intake pressure is lower than the atmospheric pressure, but the in-cylinder air amount coincides with the in-cylinder total gas amount in the supercharging region where the intake pressure is higher than the atmospheric pressure. Therefore, in the supercharging region, the in-cylinder air amount is proportional to the intake pressure, and the relationship between the in-cylinder air amount and the intake pressure depends only on the timing for closing the intake valve.

Figure 3:
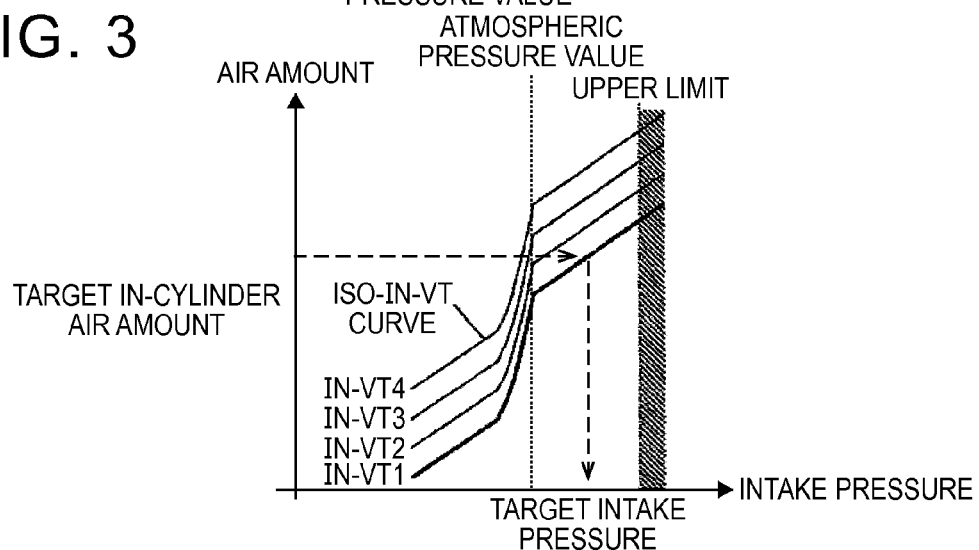
FIG. 3 is a view for explaining a method of determining a target intake pressure and a valve timing of an intake valve from a target in-cylinder air amount.
Figure 4:
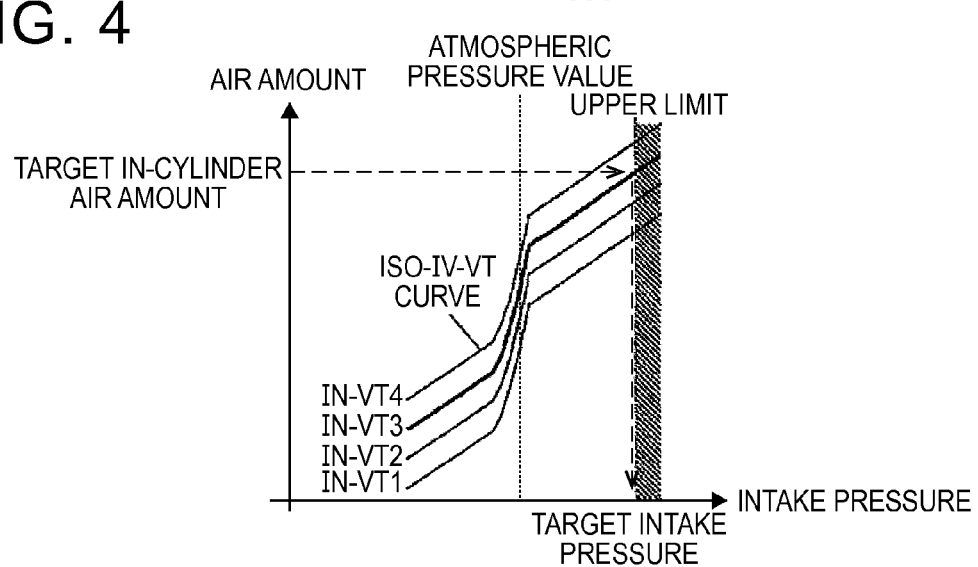
FIG. 4 is a view for explaining a method of determining the target intake pressure and the valve timing of the intake valve from the target in-cylinder air amount.

Each of FIGS. 3 and 4 represents a relationship among the valve timing of the intake valve, the intake pressure, and the in-cylinder air amount by means of a graph having an axis of abscissa indicating the intake pressure and an axis of ordinate indicating the in-cylinder air amount. Each graph linearly represents relationships between the intake pressure and the in-cylinder air amount at four different valve timings (IN-VT1, IN-VT2, IN-VT3, and IN-VT4). The respective valve timings are different from one another at least in the timing for closing the intake valve. It should be noted, however, that these four valve timings are nothing more than exemplifications, and that the intake pressure and the in-cylinder air amount are associated with each other as to more valve timings in an actual map. A method of determining the valve timing of the intake valve and the target intake pressure from the target in-cylinder air amount will be described hereinafter using FIGS. 3 and 4.

In the case where a target in-cylinder air amount is given, there may be a plurality of combinations of the valve timing of the intake valve and the intake pressure that can realize the target in-cylinder air amount. In this case, the IN-VVT control unit 120 selects a preset base valve timing, and calculates an intake pressure that can realize the target in-cylinder air amount, based on a relationship between the in-cylinder air amount and the intake pressure at the valve timing. In an example shown in each of the drawings, IN-VT1 is the base valve timing. The base valve timing is, for example, a valve timing at which fuel economy of the engine is optimized.

However, as shown in the respective drawings, the intake pressure has an upper limit. This upper limit is an upper limit of the range of the intake pressure that can be adjusted through operation of the throttle 10. For example, the intake pressure at the time when the throttle 10 is fully opened or the intake pressure at the time when the throttle 10 is opened at a maximum speed is the upper limit. The upper limit of the intake pressure in the supercharging region is a pressure that is close to but equal to or lower than the supercharging pressure.

The target intake pressure cannot be set higher than the upper limit. In the example shown in FIG. 3, the intake pressure that can realize the target in-cylinder air amount at IN-VT1 is not higher than the upper limit. Consequently, in this case, the intake pressure that can realize the target in-cylinder air amount at IN-VT1 is determined as the target intake pressure, and IN-VT1 is determined as a valve timing command value (an IN-VVT command value) for the IN-VVT 20.

On the other hand, in the example shown in FIG. 4, the intake pressure that can realize the target in-cylinder air amount at IN-VT1 is higher than the upper limit. In this case, when the upper limit of the intake pressure is set as the target intake pressure, the valve timing of the intake valve that can realize the target in-cylinder air amount is selected. The in-cylinder air amount at the time when scavenging occurs is determined by an in-cylinder volume and the intake pressure at the time when the intake valve is closed. Therefore, in the case where the intake pressure has reached the upper limit, the valve timing of the intake valve that can realize the target in-cylinder air amount (more specifically, the timing for closing the intake valve) is uniquely determined.

Thus, in the case where the intake pressure reaches the upper limit of the range that can be adjusted through operation of the throttle 10, the IN-VVT control unit 120 determines the valve timing of the intake valve in accordance with the target in-cylinder air amount, in order to control the in-cylinder air amount in accordance with the timing for closing the intake valve. In the example shown in FIG. 4, IN-VT3 is selected and set as a valve timing command value (an IN-VVT command value) for the IN-VVT 20.

The valve timing of the intake valve that is determined by the IN-VVT control unit 120 is commanded for the IN-VVT 20, and is input to the EX-VVT control unit 160. Besides, the target intake pressure that is determined by the IN-VVT control unit 120 is input to the EX-VVT control unit 160, the throttle control unit 130, and the target supercharging pressure calculation unit 140.

The target intake valve passing air amount as well as the valve timing of the intake valve and the target intake pressure is input to the EX-VVT control unit 160. The target intake valve passing air amount is a total value of the target in-cylinder air amount and a target scavenging amount that will be described later. The target scavenging amount means a target value of the amount of air blowing from the intake pipe to the exhaust pipe through scavenging. In the case where the intake valve passing air amount is larger than the in-cylinder air amount that is determined by the timing for closing the intake valve and the intake pressure, the difference therebetween is a scavenging amount.

The EX-VVT control unit 160 stores a relationship that is established among the valve overlap amount, the intake pressure, and the air amount, in the form of a map. An image of the map is represented in the form of a graph in a block of FIG. 1. In this map, the air amount that is associated with the valve overlap amount and the intake pressure means the intake valve passing air amount. In a situation where the intake pressure has reached the upper limit in the supercharging region, the intake valve passing air amount is uniquely determined by the valve overlap amount. Besides, the valve timing of the intake valve is fixed. Therefore, if the valve overlap amount is determined, the valve timing of the exhaust valve that can realize the target intake valve passing air amount (more specifically, the timing for closing the exhaust valve) is uniquely determined.

Thus, the EX-VVT control unit 160 specifies a valve overlap amount that simultaneously realizes the target intake valve passing air amount and the target intake pressure, using the map. Then, the EX-VVT control unit 160 calculates a valve timing of the exhaust valve based on the specified valve overlap amount and the valve timing of the intake valve determined by the IN-VVT control unit 120, and determines the calculated valve timing as a command value (an EX-VVT command value) for the EX-VVT 30.

The throttle control unit 130 calculates a throttle opening degree from the target intake pressure and the target intake valve passing air amount, using the inverse model of an air model. In a situation where the intake pressure has reached the upper limit in the supercharging region, the throttle opening degree that is calculated by the inverse model of the air model is a full-open opening degree. The throttle control unit 130 operates the throttle 10 using the calculated throttle opening degree as an operation amount.

The target supercharging pressure calculation unit 140 calculates, as the target supercharging pressure, a value that is obtained by adding a reserve pressure equal to or higher than 0 atm to the target intake pressure. The reserve pressure may be a fixed value or a fluctuant value that is changed in accordance with the operating state.

The WGV control unit 150 determines an operation amount of the WGV 40 from the target supercharging pressure. The operation amount of the WGV 40 is a duty value imparted to the solenoid that drives the WGV 40. The duty value is determined using a map that associates the duty value of the WGV 40 with the supercharging properties of the turbosupercharger. An image of the map is represented in the form of a graph in a block indicating the WGV control unit 150 in FIG. 1.

The supercharging properties of the turbosupercharger can be represented as a relationship between the in-cylinder air amount per unit time (hereinafter denoted by GA) and the supercharging pressure. GA is calculated by multiplying the in-cylinder air amount (in a precise sense, the in-cylinder air amount per cycle) by the engine rotational speed. A target GA and a current GA as well as the target supercharging pressure are input to the WGV control unit 150. The target GA as a target value of GA is calculated by multiplying the target in-cylinder air amount by the engine rotational speed. The current GA as a current value of GA is calculated by subtracting an estimated scavenging amount per unit time from an intake air flow rate measured by the airflow meter (an intake valve passing air amount per unit time). The estimated scavenging amount per unit time is calculated from a map in which the operating state of the engine is used as an argument.

Figure 5:
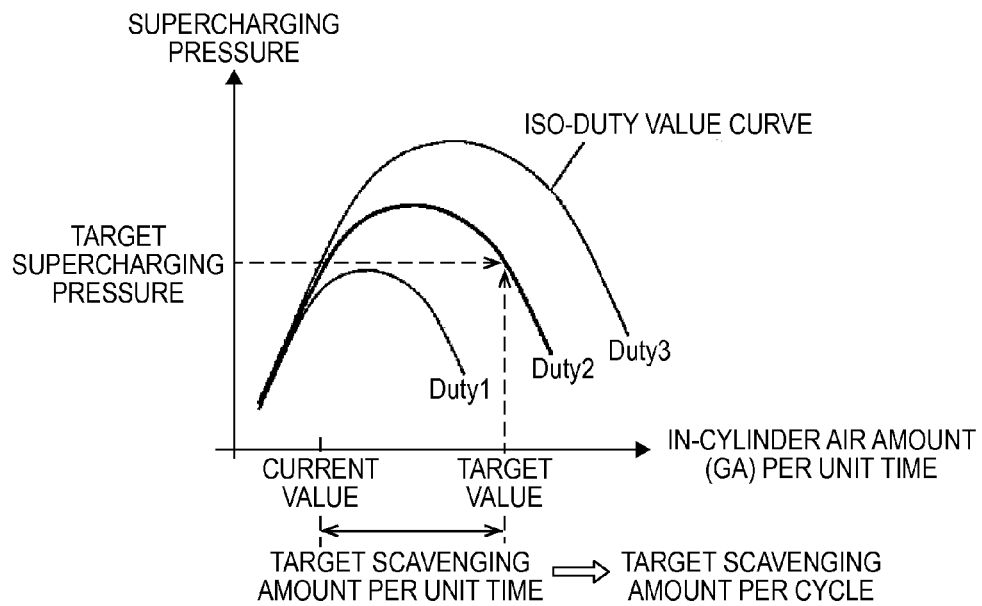
FIG. 5 is a view for explaining a duty value of a waste gate valve and a target scavenging amount.

FIG. 5 represents an image of the map used by the WGV control unit 150, in the form of a graph having an axis of abscissa indicating GA and an axis of ordinate representing the supercharging pressure. The graph represents relationships between GA and the supercharging pressure at three different duty values (Duty1, Duty2, and Duty3), in the form of curves. It should be noted, however, that these four duty values are nothing more than exemplifications, and that the intake pressure and the in-cylinder air amount are associated with each other as to more duty values in an actual map. The WGV control unit 150 retrieves from the map a duty value that simultaneously satisfies the target supercharging pressure and the target GA, and determines the retrieved duty value as the duty value of the WGV 40. In the example shown in FIG. 5, Duty2 is determined as the duty value of the WGV 40.

Furthermore, the WGV control unit 150 calculates a shortfall in the current GA with respect to the target GA. The supercharging pressure depends not only on the opening degree of the WGV 40 but also on GA. Therefore, a desired supercharging pressure cannot be obtained in the case where the current GA falls short of the target GA. Thus, the target scavenging amount is calculated from the shortfall in the current GA with respect to the target GA, in order to increase the apparent air amount with the aid of scavenging. More specifically, the shortfall in the current GA with respect to the target GA is determined as the target scavenging amount per unit time. Thus, the target scavenging amount per cycle can be calculated from the engine rotational speed. If the scavenging amount is increased, the supercharging pressure can be raised without influencing the torque. The target scavenging amount per cycle is used to calculate the target intake valve passing air amount as described above, and the valve timing of the exhaust valve is determined in accordance with the target intake valve passing air amount. Then, the EX-VVT 30 is operated in accordance with the determined valve timing, so the target scavenging amount is realized, and hence the shortfall in the current GA with respect to the target GA is compensated for. Thus, the follow-up performance of the actual supercharging pressure with respect to the target supercharging pressure is guaranteed.

Figure 6:
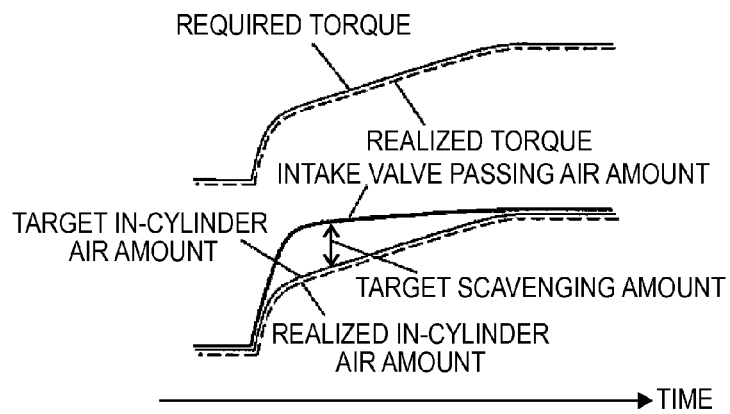
FIG. 6 is a view showing an image of a control result obtained by the control apparatus configured as shown in FIG. 1.

As described above, with the control apparatus 100 according to the present embodiment of the invention, the target in-cylinder air amount is calculated from the required torque in the supercharging region where supercharging is carried out by the turbosupercharger. Then, in the case where the intake pressure reaches the upper limit of the range that can be adjusted through operation of the throttle 10, the in-cylinder air amount is controlled by the valve timing of the intake valve, more specifically, the timing for closing the intake valve. Thus, as shown in FIG. 6, the actually realized in-cylinder air amount becomes neither too small nor too large with respect to the target in-cylinder air amount, and hence the realized torque becomes neither too small nor too large with respect to the required torque. That is, with the control apparatus 100 according to the present embodiment of the invention, the possibility of realizing the required torque in the supercharging region where scavenging occurs can be enhanced. Besides, the control apparatus 100 according to the present embodiment of the invention is also advantageous in that the scavenging amount can be voluntarily controlled in accordance with the valve timing of the exhaust valve. Thus, the intake valve passing air amount can be adjusted to any amount without influencing the torque.

Incidentally, the invention should not be limited to the aforementioned embodiment thereof, but can be carried out after being modified in various manners without departing from the gist thereof. For example, the target air amount calculation unit 110 may calculate the target in-cylinder air amount using a relational expression that associates the torque and the in-cylinder air amount with various pieces of engine information, instead of the map. The same holds true for the calculations performed by the IN-VVT control unit 120, the EX-VVT control unit 160, and the WGV control unit 150. In those calculations as well, a relational expression can be used instead of the map.

Besides, in the aforementioned embodiment of the invention, the target scavenging amount is determined as a process of WGV control by the WGV control unit 150. However, the target scavenging amount can also be determined in terms of the warm-up of the catalyst, prevention of pre-ignition and the like. Besides, the target intake valve passing air amount may also be determined by adding a predetermined value equivalent to the scavenging amount to the target in-cylinder air amount. In that case, the predetermined value may be a value equal to or larger than zero. The predetermined value may be a fixed value or a fluctuant value that is changed in accordance with the operating state of the engine.

Besides, with the supercharged engine to which the control apparatus according to the invention is applied, the intake valve driving device may be a device capable of changing at least the timing for closing the intake valve. In consequence, the intake valve driving device may not only be a variable valve timing device but also be a variable valve lift device that can also change the lift amount or the working angle, an electromagnetic valve lift device that opens/closes an intake valve by an electromagnetic valve, or the like. The same holds true for the exhaust valve driving device. The exhaust valve driving device may be a device capable of changing at least the timing for closing the exhaust valve. Therefore, the exhaust valve driving device may be a variable valve lift device or an electromagnetic valve lift device. Besides, the control apparatus according to the invention is applicable to a supercharged engine having a variable capacity-type turbosupercharger as well as a supercharged engine having a turbosupercharger equipped with a waste gate valve.

DESCRIPTION OF REFERENCE NUMERALS

10 THROTTLE
20 IN-VVT (INTAKE VALVE VARIABLE VALVE TIMING MECHANISM)
30 EX-VVT (EXHAUST VALVE VARIABLE VALVE TIMING MECHANISM)
40 WASTE GATE VALVE
100 CONTROL APPARATUS
110 TARGET AIR AMOUNT CALCULATION UNIT
120 IN-VVT CONTROL UNIT
130 THROTTLE CONTROL UNIT
140 TARGET SUPERCHARGING PRESSURE CALCULATION UNIT
150 WGV CONTROL UNIT
160 EX-VVT CONTROL UNIT

The invention claimed is:

1. A supercharged engine, having a supercharged region where an intake pressure is higher than an exhaust pressure, the supercharged engine comprising:
    an intake valve driving device capable of changing a timing for closing an intake valve;
    a throttle;
    a supercharger; and
    a control apparatus including an electronic control unit (ECU) including a processor for executing a control program for torque demand control stored in memory, the ECU is configured to control a throttle and an intake valve driving device, the ECU programed to:
    (i) calculate a target in-cylinder air amount from a required torque in the supercharging region where supercharging is carried out by the supercharger;
    (ii) calculate a target intake valve passing air amount by adding an amount of air blowing through an interior of a cylinder to the target in-cylinder air amount;
    (iii) determine an operation amount of the intake valve driving device from the target in-cylinder air amount;
    (iv) determine an operation amount of the throttle from the target intake valve passing air amount;
    (v) control the intake valve driving device such that, when supercharging is carried out by the supercharger and the intake pressure reaches an upper limit intake pressure of a range that can be adjusted through operation of the throttle, the timing for closing the intake valve corresponds to a timing mapped to the target in-cylinder air amount and the upper limit intake pressure by a map stored in the memory; and
    (vi) when supercharging is being carried out by the supercharger, close the intake valve when the intake pressure reaches the upper limit intake pressure of the range and the throttle has opened to a fully-opened position, and
    wherein, in the supercharged region, the target in-cylinder air amount is proportional to the intake pressure.

2. The supercharged engine according to claim 1, wherein the supercharged engine includes an exhaust valve driving device that changes a timing for closing an exhaust valve, and
    the ECU is configured to determine an operation amount of the exhaust valve driving device from the target intake valve passing air amount and the operation amount of the intake valve driving device.

3. The supercharged engine according to claim 2, wherein the ECU changes the timing for closing the exhaust valve based on a relationship that is established among an overlap amount of an open period of the intake valve and an open period of the exhaust valve, the intake pressure, and an intake valve passing air amount, when supercharging is carried out by the supercharger and the intake pressure reaches the upper limit intake pressure of a range that can be adjusted through operation of the throttle.

4. The supercharged engine according to claim 1, wherein the supercharger is a turbosupercharger that changes supercharging properties by an actuator attached to the turbosupercharger, the ECU is configured to determine a target supercharging pressure, the ECU is configured to calculate a target in-cylinder air amount per unit time from the target in-cylinder air amount and an engine rotational speed, and the ECU is configured to determine an operation amount of the actuator from the target in-cylinder air amount per unit time and the target supercharging pressure, based on a relationship that is established between the operation amount of the actuator and the supercharging properties of the turbosupercharger.

5. The supercharged engine according to claim 4, wherein the ECU is configured to acquire a current value of the in-cylinder air amount per unit time, the ECU is configured to calculate a target value of an amount of air blowing through the interior of the cylinder from a shortfall in the current value with respect to the target in-cylinder air amount per unit time, and the ECU is configured to determine a total value of the target in-cylinder air amount and the target value of the amount of air blowing through the interior of the cylinder, as the target intake valve passing air amount.

* * * * *